US012200000B2

(12) United States Patent
Reynolds et al.

(10) Patent No.: US 12,200,000 B2
(45) Date of Patent: Jan. 14, 2025

(54) PROGRAMMING ENVIRONMENT SECURITY MODEL

(71) Applicant: Rockwell Automation Technologies, Inc., Mayfield Heights, OH (US)

(72) Inventors: Jordan C. Reynolds, Austin, TX (US); John J. Hagerbaumer, Mequon, WI (US); Troy W. Mahr, Pleasant Prairie, WI (US); Thomas K. Jacobsen, Wake Forest, NC (US); Giancarlo Scaturchio, Pisa (IT)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 242 days.

(21) Appl. No.: 17/870,516

(22) Filed: Jul. 21, 2022

(65) Prior Publication Data
US 2024/0031387 A1    Jan. 25, 2024

(51) Int. Cl.
*H04L 9/40*        (2022.01)
(52) U.S. Cl.
CPC ...... *H04L 63/1425* (2013.01); *H04L 63/1441* (2013.01)
(58) Field of Classification Search
None
See application file for complete search history.

(56) References Cited

U.S. PATENT DOCUMENTS

| 2004/0267515 | A1* | 12/2004 | McDaniel | G05B 19/0426 |
| | | | | 703/22 |
| 2018/0124080 | A1* | 5/2018 | Christodorescu | G06F 21/552 |
| 2020/0285737 | A1 | 9/2020 | Kraus et al. | |
| 2021/0273965 | A1 | 9/2021 | Pi et al. | |
| 2022/0187798 | A1* | 6/2022 | Azamfar | G05B 23/0283 |
| 2022/0283858 | A1* | 9/2022 | Regge | G06F 9/505 |
| 2023/0106369 | A1* | 4/2023 | Flynn | G06F 9/4881 |
| | | | | 718/103 |
| 2023/0385143 | A1* | 11/2023 | Mohanty | G06F 18/24323 |
| 2023/0409714 | A1* | 12/2023 | Chen | G06N 5/01 |

OTHER PUBLICATIONS

Extended European Search Report in EP23181462.5, mailed Jan. 5, 2024, 6 pages.

* cited by examiner

*Primary Examiner* — Piotr Poltorak
*Assistant Examiner* — Suman Debnath

(57) ABSTRACT

Various embodiments of the present technology generally relate to industrial automation environments. More specifically, embodiments include systems and methods to detect malicious behavior in an industrial automation environment. In some examples, a security component monitors an integrated design application and generates feature vectors that represent operations of the integrated design application. The security component supplies the feature vectors to a machine learning engine. The security component processes a machine learning output that indicates when anomalous behavior is detected in the operations of the integrated design application. When anomalous behavior is detected in the operations of the integrated design application, the security component generates and transfers an alert that characterizes the anomalous behavior.

20 Claims, 7 Drawing Sheets

PROGRAMMING ENVIRONMENT SECURITY MODEL

TECHNICAL FIELD

Various implementations disclosed herein relate to industrial automation technology, and more specifically, to anomaly detection.

BACKGROUND

Industrial manufacturing environments comprise computing and mechanical systems configured to implement an industrial process. In industrial automation environments, control systems are used to drive various operations along an industrial line. Control programs are developed by programmers in integrated design applications. The integrated design applications comprise programming tools to design control schemes for the industrial manufacturing environments. The control programs comprise a set of program tags to carry out an industrial operation. The program tags comprise chunks of the control code and correspond to industrial assets, devices, and sensors. The control programs are used by control systems like Programmable Logic Controllers (PLCs) to drive the industrial assets, devices, and sensors in an industrial process. The integrated design applications communicate with numerous systems within industrial manufacturing environments like PLCs and orchestration systems. Integrated design applications may also communicate and with external systems. The numerous communication links create security vulnerabilities in the integrated design applications.

Machine learning algorithms are designed to recognize patterns and automatically improve through training and the use of data. Examples of machine learning algorithms include artificial neural networks, nearest neighbor methods, gradient-boosted trees, ensemble random forests, support vector machines, naïve Bayes methods, and linear regressions. A machine learning algorithm comprises an input layer and an output layer, wherein complex analyzation takes places between the two layers. Various training methods are used to train machine learning algorithms wherein an algorithm is continually updated and optimized until a satisfactory model is achieved. One advantage of machine learning algorithms is their ability to learn by example, rather than needing to be manually programmed to perform a task, especially when the tasks would require a near-impossible amount of programming to perform the operations in which they are used. Unfortunately, industrial manufacturing environments do not effectively and efficiently utilize machine learning functionality to combat the security vulnerabilities in integrated design applications. Moreover, traditional security systems for integrated design applications are expensive.

Overview

This Overview is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Various embodiments of the present technology generally relate to solutions for integrating machine learning models into industrial automation environments. Some embodiments comprise a system to detect malicious behavior in an industrial automation environment. In some examples, the system comprises a security component. The security component monitors an integrated design application and generates feature vectors that represent operations of the integrated design application. The security component supplies the feature vectors to a machine learning engine. The security component processes a machine learning output that indicates when anomalous behavior is detected in the operations of the integrated design application. When anomalous behavior is detected in the operations of the integrated design application, the security component generates and transfers an alert that characterizes the anomalous behavior.

Some embodiments comprise methods to detect malicious behavior in an industrial automation environment. The method entails monitoring, by a system comprising a processor, an integrated design application. The method continues with generating, by the system, feature vectors that represent operations of the integrated design application and supplying the feature vectors to a machine learning engine. The method continues with processing, by the system, a machine learning output that indicates when anomalous behavior is detected in the operations of the integrated design application. The method continues with generating and transferring, by the system, an alert that characterizes the anomalous behavior when the anomalous behavior is detected in the operations of the integrated design application.

Some embodiments comprise a non-transitory computer-readable medium stored thereon instructions to detect malicious behavior in an industrial automation environment. The instructions, in response to execution, cause a system comprising a processor to perform operations. In some examples, the operations comprise monitoring an integrated design application and generating feature vectors that represent operations of the integrated design application. The operations further comprise supplying the feature vectors to a machine learning engine. The operations further comprise processing a machine learning output that indicates when anomalous behavior is detected in the operations of the integrated design application. The operations further comprise generating and transferring an alert that characterizes the anomalous behavior when anomalous behavior is detected in the operations of the integrated design application.

BRIEF DESCRIPTION OF THE DRAWINGS

Many aspects of the disclosure can be better understood with reference to the following drawings. The components in the drawings are not necessarily drawn to scale. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

Figure 1:
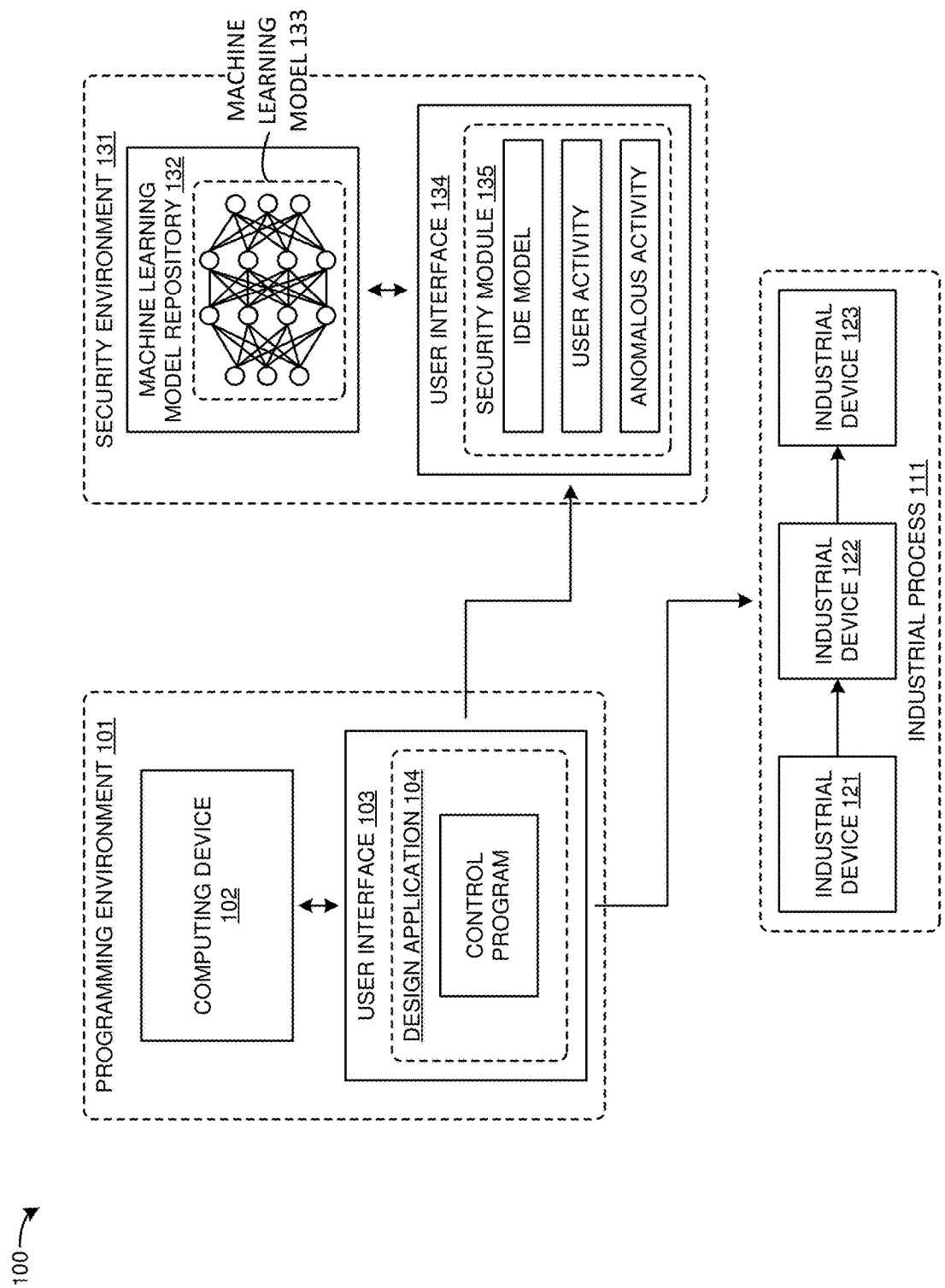
FIG. 1 illustrates an exemplary industrial automation environment to detect anomalous behavior in an integrated design application.

The drawings have not necessarily been drawn to scale. Similarly, some components or operations may not be separated into different blocks or combined into a single block for the purposes of discussion of some of the embodiments of the present technology. Moreover, while the technology is amendable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Various embodiments of the present technology generally relate to solutions for integrated design application security in industrial automation environments. More specifically, embodiments of the present technology include systems and methods for utilizing machine learning systems to detect and prevent anomalous or malicious behavior in integrated design applications. Integrated design applications comprise a set of programming tools to generate control programs. The control programs comprise instructions for controlling and performing certain operations within an industrial environment. Industrial controllers like Programmable Logic Controllers (PLCs) receive and execute the control programs. The PLCs generate control signaling based on the execution of the control program and transfer the control signaling to drive the operation of downstream devices, machinery, and automated processes.

The present technology serves to enhance industrial control by enabling the use of machine learning models to reduce security vulnerabilities in integrated design applications. Industrial automation environments often fail to effectively utilize machine learning models for security purposes. In an implementation of the present technology, machine learning models may be made available to operators in an industrial security environment. Security environments allow a plant operator to review the operating states of systems within the industrial automation environment to determine when systems deviate from their normal operating states.

In some embodiments, machine learning models may be connected with other elements within the industrial automation environment like integrated design applications. In an embodiment, a security application monitors the inputs and actions performed by the integrated design application. The integrated design application reports its operating state to the security application. In response, a machine learning model may generate a machine learning outputs that indicate when the integrated design application exhibits abnormal behavior. For example, the machine learning model may create a statistical model that represents the integrated design application. The machine learning model may compare operational metrics reported by the integrated design application with the statistical model representing to identify any anomalous or malicious behavior in the integrated design application.

A machine learning model comprises one or more machine learning algorithms that are trained based on historical data and/or other types of training data. A machine learning model may employ one or more machine learning algorithms through which data can be analyzed to identify patterns, make decisions, make predictions, or similarly produce output that can inform the security state of an integrated design application. Examples of machine learning algorithms that may be employed solely or in conjunction with one another include neural network auto encoders, unsupervised anomaly detection algorithms, artificial neural networks, nearest neighbor methods, ensemble random forests, support vector machines, naïve Bayes methods, linear regressions, or similar machine learning techniques or combinations thereof capable of predicting output based on input data. Determining which machine learning methods to use may depend on the specific purpose or functions required in a particular industrial setting. Machine learning models may be deployed on premises in an industrial automation environment or off-site. For example, the machine learning model may be implemented in a security environment and have a live connection with integrated design applications configured to generate control programs.

To accompany the use of integrated design application security models, corresponding faceplates, displays, Graphical User Interfaces (GUIs), and the like are contemplated herein to provide intuitive representations and interfaces to for detecting anomalous and malicious behavior in integrated design applications. A GUI may comprise basic controls and/or visuals relevant to identifying, and responding to, anomalous or malicious behavior. In this manner, machine learning can be brought into the security environment. For example, a security operator may interact with a GUI to perform a task such as reviewing machine learning anomaly predictions and generating commands to respond to the detected anomalies. The GUI may also be useful for performing tasks such as training models, offsetting model parameters, tuning parameters of the model, generating statistical representations of integrated design applications, providing inputs, or overriding the model.

Now referring to the Figures, FIG. 1 illustrates industrial automation environment 100 to detect anomalous behavior in an integrated design application. Industrial automation environment 100 performs services like factory automation, factory control, machine control, smart manufacturing, machine communication and organization, and the like. Industrial automation environment 100 comprises programming environment 101, industrial process 111, industrial devices 121-123, and security environment 131. Programming environment 101 comprises computing device 102, user interface 103, and design application 104. Security environment 131 comprises machine learning model repository 132, machine learning model 133, user interface 134, and security module 135. In other examples, industrial automation environment 100 may include fewer or additional components than those illustrated in FIG. 1. Likewise, the illustrated components of industrial automation environment 100 may include fewer or additional components, assets, or connections than shown. Each of computing device 102, user interface 103, repository 132, and user interface 134 may be representative of a single computing apparatus or multiple computing apparatuses.

Programming environment 101 is representative of programming tools to generate control programs to control the operations of industrial devices 121-123 to implement industrial process 111. Computing device 102 comprises one or more computing apparatuses configured to host an integrated design application to generate the control programs. It should be appreciated that the specific number of applications/modules hosted by computing device 102 of programming environment 101 is not limited. Exemplary integrated design applications comprise Studio 5000® and the like. Computing device 102 is operatively coupled to user interface 103.

User interface 103 is representative of a Guided User Interface (GUI) configured to display design application 104. User interface 103 comprises one or more computing devices, display screens, touch screen devices, tablet devices, mobile user equipment, keyboards, and the like. Design application 104 comprises a control program. Design application 104 may receive a series of user inputs via user interface 103 that drives computing device 102 and design application 104 to generate the control program. The control program generated in programming environment 101 comprises machine instructions that direct the operations of industrial devices 121-123 to implement industrial process 111. The control programs may comprise functional block diagrams, ladder logic programs, or some other type of machine instructions. Computing device 102 may transfer the control program for delivery to a Programmable Logic Controller (PLC) to implement and control industrial process 111. Programming environment 101 may comprise transceiver systems that allow design application 104 to upload the control program to PLCs.

Industrial process 111 is representative of a manufacturing, chemical production, energy generation, food processing, or any other type of industrial process. Industrial devices 121-123 are representative of machines configured to carry out industrial process 111. Industrial devices 121-123 are representative of pumps, generators, motors, turbines, heat exchanges, reactors, distillation systems, food processing systems, or any other type of industrial device. Typically, the type of machines represented by industrial devices 121-123 depends in part on the type of process that industrial process 111 is representative of. Industrial devices 121-123 may receive control signaling generated by a PLC in response to executing a control program. The PLC may comprise one or more computing devices configured to implement control programs generated in programming environment 101 to control industrial process 111. For example, the PLC may receive and execute a ladder logic control program received from programming environment 101 and responsively transfer corresponding control signaling to industrial devices 121-123. Industrial devices 121-123 operate in response to the control signaling to implement industrial process 111. The control signaling drives actuators in industrial devices 121-123 that dictate the operations of industrial devices 121-123. For example, the control signaling may correspond to an actuator setting that sets a motor speed in industrial device 141 to a desired value. In other examples, the control signaling may correspond to an actuator setting that sets a pump valve to an open position. It should be appreciated that the type of operations performed by industrial devices 121-123 depends in part on their type on the process type of industrial process 111.

Security environment 131 is representative of one or more computing devices configured to host machine learning models and security applications to detect anomalous and malicious behavior in programming environment 101. Security environment 131 comprises machine learning model repository 132. Machine learning model repository 132 is representative of one or more computing devices configured to host machine learning model 133. For example, repository 132 may comprise an application specific circuit configured to implement a machine learning model. Machine learning model 133 comprises any machine learning models implemented within industrial automation environment 100 as described herein. Machine learning model 133 is configured to ingest operational data that depicts the operations within programming environment 101 and generate machine learning outputs that indicate when programming environment 101 deviates from a normal operating behavior. For example, an output may indicate design application 104 is exhibiting bot behavior, generating abnormal control programs, being accessed by an unauthorized source, or some other type of anomalous behavior. Machine learning model 133 may be trained using feature vectors that represent a normal operating mode for programming environment 101. In some examples, machine learning model repository 132 comprises one or more applications configured to generate feature vectors configured for ingestion by model 133.

Model repository 132 is coupled to user interface 134. User interface 134 comprises displays, keyboards, touchscreens, tablet devices, mobile user equipment, and the like. User interface 134 displays a GUI that allows a user to interact with security module 135 and machine learning model 133. For example, a user may interact with the GUI to receive an alert that machine learning model 133 detected malicious behavior in design application 104. User interface 134 is configured to display security module 135. Security module 135 is representative of a security application that allows a user to assess the security state of programming environment 101 and to identify abnormal behavior in design application 104. Security module 135 comprise an integrated design environment (IDE) model window, a user activity window, and an anomalous activity window. The integrated design environment window may comprise one or more visual elements that depict a normal set of operations for design application 104. The user activity window may comprise one or more visual elements that track user actions in design application 104. The anomalous activity window may comprise one or more visual elements that identifies actions performed in design application 104 that machine learning model 133 has deemed anomalous. In other examples, the visual elements that security module 135 comprises may differ.

Computing device 102, user interface 103, industrial devices 121-123, repository 132, and user interface 134 communicate over various communication links using communication technologies like industrial ethernet, Institute of Electrical and Electronic Engineers (IEEE) 802.3 (ENET), IEEE 802.11 (WIFI), Bluetooth, Time Division Multiplex (TDM), Data Over Cable System Interface Specification (DOCSIS), Internet Protocol (IP), General Packet Radio Service Transfer Protocol (GTP), and/or some other type of wireline and/or wireless networking protocol. The communication links comprise metallic links, glass fibers, radio channels, or some other communication media. The links use ENET, WIFI, virtual switching, inter-processor communication, bus interfaces, and/or some other data communication protocols.

Computing device 102, user interface 103, industrial devices 121-123, repository 132, and user interface 134 comprise microprocessors, software, memories, transceivers, bus circuitry, and the like. The microprocessors comprise Central Processing Units (CPUs), Graphical Processing Units (GPUs), Digital Signal Processors (DSPs), Application-Specific Integrated Circuits (ASICs), Field Programmable Gate Arrays (FPGAs), analog computing circuits, and/or the like. The memories comprise Random Access Memory (RAM), flash circuitry, Hard Disk Drives (HDDs), Solid State Drives (SSDs), Non-Volatile Memory Express (NVMe) SSDs, and/or the like. The memories store software like operating systems, user applications, networking applications, control applications, security applications, machine learning applications, and the like. The microprocessors retrieve the software from the memories and execute the software to drive the operation of industrial automation environment 100 as described herein.

Figure 2:
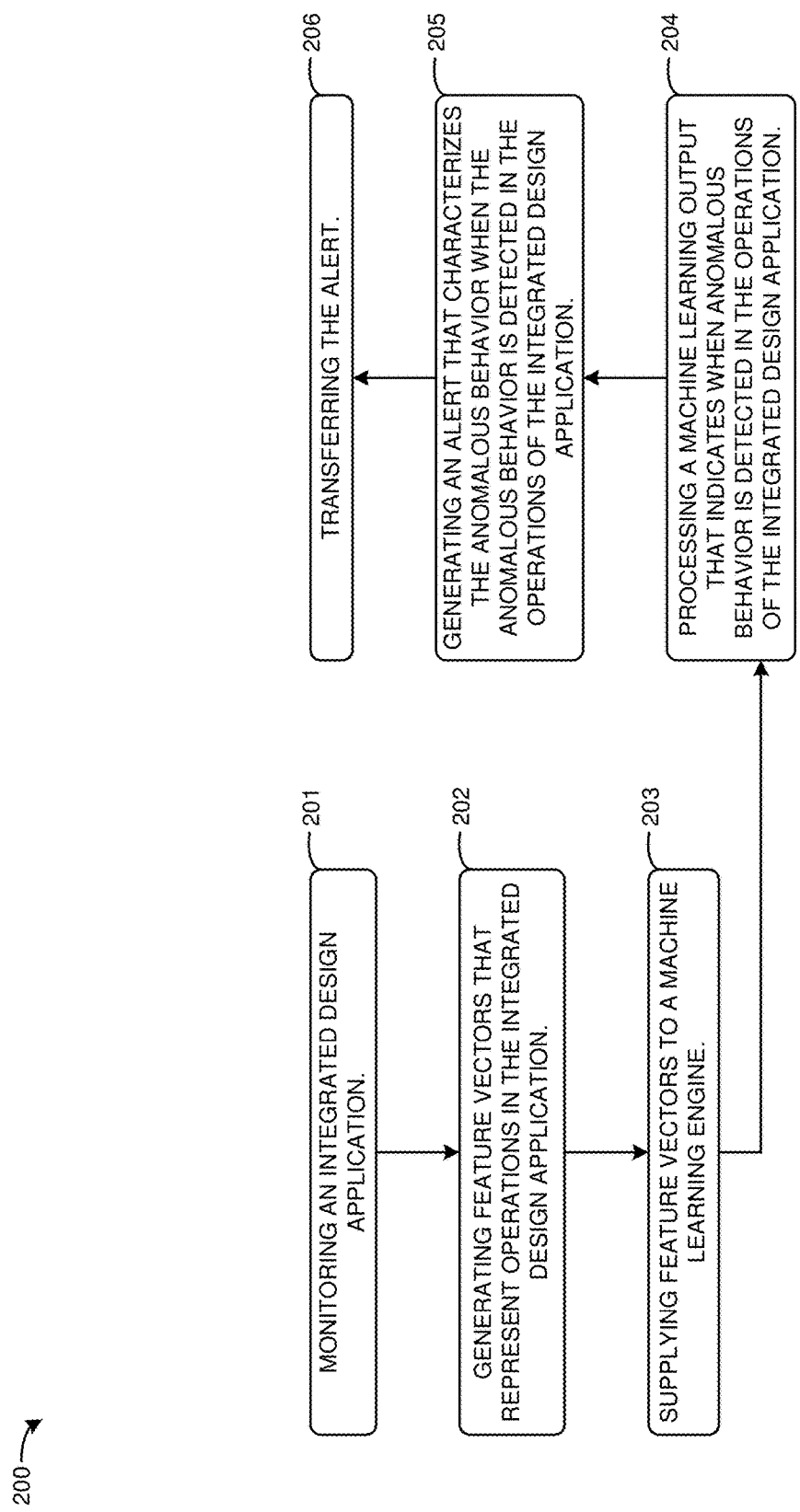
FIG. 2 illustrates an exemplary operation of an industrial automation environment to detect anomalous behavior in an integrated design application.

In some examples, industrial automation environment 100 implements process 200 illustrated in FIG. 2. It should be appreciated that the structure and operation of industrial automation environment 100 may differ in other examples.

FIG. 2 illustrates process 200. Process 200 comprises anomalous behavior detection process in an integrated design application of an industrial automation environment. Program 200 may be implemented in program instructions in the context of any of the software applications, module components, machine learning components, or other such elements of one or more computing devices. The program instructions direct the computing device(s) to operate as follows, referred to in the singular for the sake of clarity.

In operation, process 200 begins by monitoring an integrated design application (step 201). The operation continues by generating feature vectors that represent operations in the integrated design application (step 202). The operation continues by supplying feature vectors to a machine learning engine (step 203). The operation continues by processing a machine learning output that indicates when anomalous behavior is detected in the operations of the integrated design application (step 204). The operation continues by generating an alert that characterizes the anomalous behavior when the anomalous behavior is detected in the operations of the integrated design application (step 205). The operation continues by transferring the alert (step 206).

Referring back to FIG. 1, industrial automation environment 100 includes a brief example of process 200 as employed by one or more applications hosted by the various computing devices comprising industrial automation environment 100.

In operation, design application 104 hosted by computing device 102 in programming environment 101 generates a control program that is configured for implementation by a PLC. For example, design application 104 may receive user inputs via user interface 103 and responsively generate a control program based on the user inputs. The user inputs may comprise clicks, drag-and-drop actions, touch screen inputs, keyboard inputs, and the like. The control program may comprise a set of program tags that form a latter logic diagram. The program tags comprise control code that drive the operation of industrial process 111. Security module 135 monitors the operations of design application 104 (step 201). For example, security module may have a live connection with to monitor the inputs and actions to design application 104. Design application 104 may generate and transfer status reports for delivery to security module 135. The information received by security module 135 comprises rate of inputs, time of inputs, source of inputs, control program type, and other types of information that characterizes the security state of design application 104. Security module 135 may solicit the security relevant information from design application 104. Alternatively, design application 104 may transfer security relevant information for delivery to security module 135 automatically without solicitation by module 135.

Design application 104 transfers the control program to implement industrial process 111. For example, design application 104 may drive transceiver circuitry in computing device 102 to upload the control program to a PLC. The PLC may execute the control program and generate control signaling based on the execution of the control program. The PLC may transfer the control signaling to industrial devices 121-123 to implement process 111. Industrial devices 121-123 operate in response to the control signaling and generate process data that characterizes their operations. For example, the operational data may comprise metrics like operating speed, operating temperature, units consumed, units produced, and the like.

Security module 135 generates feature vectors that represent the operations of operations of design application 104 (step 202). The feature vectors comprise sets of numeric values that represent the security relevant information received from design application 104. The feature vectors are ingestible by machine learning model 133. Security module 135 may run a feature extraction process on the security relevant information to generate the derivative values. Security module 135 may then group the derivative values together to form the feature vectors. Each feature vector may represent an aspect of the security relevant information. For example, a set of the feature vectors may represent the rate of inputs to user interface 103 while another set of the feature vector may represent the time/date of the inputs. Security module 135 supplies the feature vectors to machine learning model repository 132 (step 203).

Machine learning model 133 ingests the feature vectors generated by security module 135. Machine learning model 133 utilizes its constituent machine learning algorithms to process the feature vectors and generate a machine learning output. The machine learning output comprises an indication as to whether the design application 104 is exhibiting abnormal behavior. For example, the output may indicate that design application 104 exhibited bot-like behavior, that the control program comprises malicious characteristics, the source of the inputs in not authorized to generate control programs, and/or other indicates of anomalous behavior. Machine learning model repository 132 transfers the machine learning output to security module 135. Security module 135 processes the machine learning output that indicates when anomalous behavior is detected in the operations of design application 104 (step 204). For example, security module 135 may apply a threshold, white/blacklist, or some other type of security indicator to the machine learning output to determine the anomalous behavior. Alternatively, the machine learning output may identify the anomalous behavior without additional processing from security module 135.

When anomalous behavior is detected in the operations of design application 104, security module 135 generates an alert that characterizes the anomalous behavior (step 205). For example, security module 135 may present the alert on user interface 134 in the anomalous activity window. Security module 135 transfers the alert to other systems in industrial automation environment 100 (step 205). By transferring the alert, security module 135 can drive the other systems in environment 100 to respond to the anomalous behavior. For example, security module 135 may have identified automated activity within design application 104 based on a machine learning output. In response, security module 135 may transfer the alert to design application 104.

Advantageously, industrial automation environment 100 effectively utilizes machine learning systems to improve the security of integrated design applications. Moreover, security environment 131 employs machine learning model 133 to detect when anomalous behavior occurs in design application 104.

Figure 3:
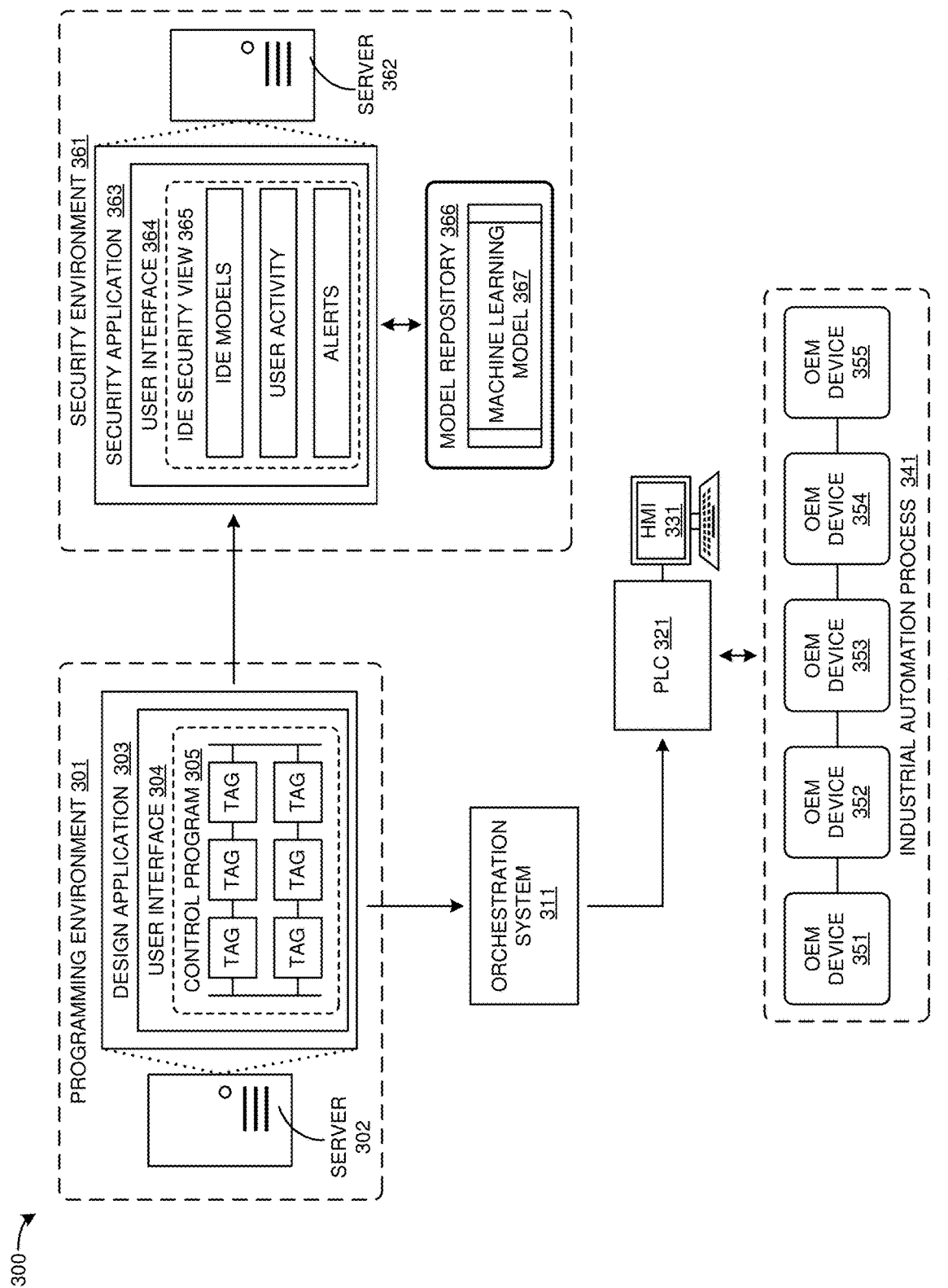
FIG. 3 illustrates an exemplary industrial automation environment to detect anomalous behavior in an integrated design application.

FIG. 3 illustrates industrial automation environment 300 to detect anomalous behavior in an integrated design application. Industrial automation environment 300 comprises an example of industrial automation environment 100, however environment 100 may differ. Industrial automation environment 300 comprises programming environment 301, orchestration system 311, Programmable Logic Controller (PLC) 321, Human Machine Interface (HMI) 331, industrial automation process 341, Original Equipment Manufacturer (OEM) devices 351-355, and security environment 361. Programming environment 301 comprises server 302, design application 303, user interface 304, and control program 305. Security environment 361 comprises server 362, security application 363, user interface 364, Integrated Design Environment (IDE) security view 365, model repository 366, and machine learning model 367. IDE security view 365 comprise visual elements for IDE models, user activity, and alerts.

Programming environment 301 is representative of one or more computing devices integrated into a network configured to generate control programs for industrial automation environment 300. Programming environment 301 comprises server 302. Server 302 comprises one or more computing device configured to host design application 303. The one or more computing devices of server 302 comprise processors, bus circuitry, storage devices, software, and the like. The processors may comprise CPUs, GPUs, DSPs, ASICs, FPGAs, and the like. The storage devices comprise flash drives, RAM, HDDs, SSDs, NVMe SSDs, and the like. The storage devices store the software like design application 303. The processors may retrieve and execute software stored on the storage devices to drive the operation of design application 303. Design application 303 is representative of one or more integrated design applications, user interface applications, operating systems, modules, and the like. Design application 303 is configured to receive user inputs via user interface 304 and generate control program 305 based on the user inputs and/or other types of inputs.

User interface 304 is representative of a display that provides a graphical representation of design application 303. The graphical representation may include one or more visual indicators relevant to control program 305, such as visual indicators of visual code blocks, ladder logic, code chunks, functional block diagrams, and/or other types of visual indictors. User interface 304 may comprise a display screen for viewing or use by an operator or similar user within programming environment 301. User interface 304 may include a computer, a mobile device, a kiosk, a touch-screen device, or some other type of computing device capable of performing the user interface functions described herein. A user may interact with design application 303 via user interface 304 to generate control program 305. Upon generation of control program 305, design application 303 may transfer control program 305 to implement industrial automation process 341. For example, transceiver circuitry in server 302 may upload control program 305 to PLC 321 via industrial ethernet links.

Design application 303 is configured to transfer security relevant information to security application 363. The security relevant information may comprise control program type, program tag type, user inputs, input rate, input type, input time/date, input source Internet Protocol (IP) addresses, geographic locations associated with input source IP addresses, and other types of information that characterizes the operations of design application 303. Design application 303 may periodically, continuously, or randomly transfer the security relevant information to security application 363 without prompting by security application 363. For example, design application 303 may comprise a user defined reporting schedule to transfer the security relevant information according to the reporting schedule. Alternatively, design application 303 may receive requests from security application 363 and transfer the security information to security application 363 in response to the requests. It should be appreciated that the method by which design application 303 and security application 363 share the security relevant information is not limited.

Orchestration system 311 is representative of one or more computing devices integrated into a network configured to manage and coordinate the operation of PLC 321. Orchestration system 311 hosts one or more orchestration programs configured to manage PLC 321. Exemplary orchestration programs include Pavilion8® and the like. The orchestration program hosted by system 311 may receive control programs from programming environment 301 and distribute control programs to PLC 321. The orchestration program may direct PLC 321 when to activate the uploaded control program to coordinate the operations of PLC 321 with other PLCs in environment 300. The one or more computing devices of orchestration system 311 comprise processors, bus circuitry, storage devices, software, and the like. The processors may comprise CPUs, GPUs, DSPs, ASICs, FPGAs, and the like. The storage devices comprise flash drives, RAM, flash circuitry, HDDs, SSDs, NVMe SSDs, and the like. The storage devices store the software. The processors may retrieve and execute software stored on the storage devices to drive the operation of orchestration system 311.

PLC 321 comprise one or more computing devices configured to receive and execute control programs to generate control signaling for OEM devices 351-355. PLC 321 controls the automated and coordinated operation of industrial process 341. PLC 321 may implement control programs that may be designed using any number of programming tools in an integrated design environment (e.g., design application 303) such as text-based coding, functional block diagrams, ladder logic, graphics-based programming, or other types of programming interfaces. The control program may be designed or programmed on a design computer running an integrated design environment (e.g., design application 303), then transmitted or uploaded to PLC 321. Alternatively, the control program may be implemented with a system of hardware connections in PLC 321 or in programmable PLC modules by which a PLC can be upgraded to add more control capacity as its industrial automation process grows in sophistication.

PLC 321 controls OEM devices 351-355 by sending the control signaling over one or more data channels that support synchronous or asynchronous communications to implement industrial process 341. Industrial process 341 may comprises a process for manufacturing goods but may also comprise processes occurring within a utility plant (e.g., an electrical power plant), research or laboratory facility (e.g., a sample testing or processing facility), processes occurring within a food processing facility (e.g., a cattle processing plant), processes occurring within a chemical processing facility (e.g., petroleum refinery), or any other suitable industrial automated environment. OEM devices 351-355 comprise factory or industrial machinery or manufacturing equipment such as conveyor belts or other conveyance mechanisms, robotic devices or other automated or programmable devices, packaging devices including boxing, capping, and sealing equipment, processing equipment, mixers, filling stations, quality control equipment, and other devices associated with manufacturing or other industrial processes.

PLC 321 comprises one or more computing devices. The one or more computing devices of PLC 321 comprise processors, bus circuitry, storage devices, software, and the like. The processors may comprise CPUs, GPUs, DSPs, ASICs, FPGAs, and the like. The storage devices comprise flash drives, RAM, HDDs, SSDs, NVMe SSDs, and the like. The storage devices store the software. The processors may retrieve and execute software stored on the storage devices to drive the operation of PLC 321. In some examples, PLC 321 may host machine learning systems to inform the control actions performed by PLC 321.

HMI 331 are representative of one or more computing devices configured to illustrate the operating conditions of PLC 321 and receive user inputs to affect the operations of PLC 321. For example, HMI 331 may receive a notification from security environment 361 flagging a control program as anomalous and HMI 331 may present the notification on its user interface systems. The one or more computing devices comprise processors, bus circuitry, storage devices, software, and the like. The processors may comprise CPUs, GPUs, DSPs, ASICs, FPGAs, and the like. The storage devices comprise flash drives, RAM, HDDs, SSDs, NVMe SSDs, and the like. The storage devices store the software. The processors may retrieve and execute software stored on the storage devices to drive the operation of HMI 331. Although HMI 331 is illustrated as a personal computing device, HMI 331 may comprise server computers, mobile devices, kiosks, touchscreen devices, faceplates, or other types of computing device capable of performing the functions described herein.

Industrial automation process 341 is representative of a manufacturing process, chemical production process, food processing process, or any other type of industrial process. Although industrial automation process 341 is depicted with five OEM devices, in other examples automated systems may comprise a different number of OEM devices. OEM devices 351-355 may comprise devices like pumps, compressors, heat exchanges, centrifuges, mills, conveyers, filters, and the like. OEM devices 351-355 may comprise subcomponents (not illustrated for clarity) like motors, valves, electrical circuitry, processing circuitry, storage circuitry, transceivers, machined parts, and the like.

OEM devices 351-355 are coupled to PLC 321. PLC 321 transfers control signaling generated by the execution of control program 305 to OEM devices 351-355 to implement industrial automation process 341. OEM devices 351-355 receive their respective control signaling and operate according to the instructions. For example, OEM device 351 may comprise an electric motor to drive a pump. PLC 321 may execute the control program (e.g., control program 305) and determine a current level to power the electric motor at to achieve a desired pressure differential in the pump. PLC 321 may transfer control signaling to the motor in OEM device 351. Actuators in the motor of OEM device 351 may receive the control signaling and apply the indicated current level to achieve the necessary power level for the electric motor to drive the motor at the speed necessary to achieve the desired pressure differential.

Security environment 361 comprises server 362. Server 362 is representative of one or more computing devices integrated into a network that communicates with server 302 and model repository 366. Examples of server 362 may include server computers and data storage devices deployed on-premises, in the cloud, in a hybrid cloud, or elsewhere, by service providers such as enterprises, organizations, individuals, and the like. Server 362 may rely on the physical connections provided by one or more other network providers such as transit network providers, Internet backbone providers, and the like for communication purposes. Server 362 is configured to host security application 363 which comprises user interface 364 and IDE security view 365.

Server 362 comprises processors, bus circuitry, storage devices, software, and the like configured to host security application 363. The processors may comprise CPUs, GPUs, DSPs, ASICs, FPGAs, and the like. The storage devices comprise flash drives, RAM, HDDs, SSDs, NVMe SSDs, and the like. The storage devices store the software. The processors may retrieve and execute software stored on the storage devices to drive the operation of security application 363.

Security application 363 is representative of one or more applications configured to monitor the operations of design application 303, to detect abnormal activity in design application 303, to present the identified abnormal activity to human operators via a user interface, and to transfer alerts to drive other systems in environment 100 to respond to the abnormal activity. Security application 363 receives security information from design application 303 that comprises information characterizing the operations of design application 303. For example, the security information may comprise control program type, program tag type, user inputs, input rate, input type, input time/date, input source IP addresses, geographic locations associated with input source IP addresses, and other types of information that characterizes the operations of design application 303. Security application 363 performs a feature extraction process to format the security information for ingestions by machine learning model 367. Upon generation of the feature vectors, security application 363 may transfer the feature vectors for delivery to machine learning model 367.

Security application 363 comprises user interface 364. User interface 364 comprise an on-screen display and may be displayed using a computer, a mobile device, a kiosk, a touchscreen device, or some other type of computing device capable of performing the user interface functions described herein. User interface 364 comprises IDE security view 365. IDE security view 365 is representative of one of more visual elements on user interface 365 that communicate to a user the operating behavior of design application 303, user activity occurring in design application 303, alerts indicating anomalous behavior observed in design application 363, and/or other information regarding the security of design application 303. In this example, IDE security view 365 comprises visual elements for IDE models, user activity, and alerts, however it should be appreciated IDE security view 365 may comprise different or additional visual elements in other examples. IDE security view 365 may comprise one or more user selectable options to respond to the detection of anomalous behavior in design application 303. The responses may comprise the generation and transfer of alerts/notifications, deactivation commands, blocking communication, and/or other types of responses. In some examples, security application 363 receives user inputs via the user selectable options on IDE security view 365 and may operate according to the user selection (e.g., transferring a message to deactivate a flag a control program as malicious). Security application 363 is communicatively coupled to model repository 366.

Model repository 366 is representative of one or more computing devices configured to implement machine learning model 367. The one or more computing devices of repository 366 comprises processors, bus circuitry, storage devices, software, and the like configured to machine learning model 367. The processors may comprise CPUs, GPUs, DSPs, ASICs, FPGAs, analog computing circuits, and the like. The storage devices comprise flash drives, RAM, HDDs, SSDs, NVMe SSDs, and the like. The storage devices store the software. The processors may retrieve and execute software stored on the storage devices to drive the operation of machine learning model 367.

Machine learning model 367 comprises one or more machine learning algorithms that are trained to identify anomalous behavior and malicious activity in design application 303. Machine learning model 367 employ one or more machine learning algorithms through which data can be analyzed to identify patterns, make decisions, make predictions, or similarly produce output that can determine the presence of anomalous and/or malicious activity in design application 303. Examples of machine learning algorithms that may be employed solely or in conjunction with one another include neural network auto encoders and unsupervised anomaly detection algorithms. Other examples of suitable machine learning algorithms include artificial neural networks, nearest neighbor methods, ensemble random forests, support vector machines, naïve Bayes methods, linear regressions, or other types of machine learning algorithms that predict output data based on input data. Machine learning model 367 may utilize supervised learning methods, unsupervised learning methods, and/or reinforcement learning methods to train itself. The training data for model 367 may comprise feature vectors that comprise numeric representations of normal design applications operations. For example, model 367 may be trained using feature vectors that represent expected control programs and program tags used in design application 303.

Machine learning model 367 utilizes the training data to construct a statistical model of design application. The statistical model may comprise probabilities of various operations of design application 303. Normal and expected operations in design application 303 are assigned higher probabilities than infrequent operations in design application 303. Model 367 may use the probabilities of the statistical model to flag operations in design application 303 as abnormal. For example, model 367 may ingest feature vectors depicting a user input rate in design application 303. Model 363 may determine the user input rate is an outlier based on the statistical model and responsively flag the user input rate as abnormal. An outlier may comprise an operation of design application 303 that falls several standard deviations from a statistically predicted output from the statistical model constructed by model 363.

Figure 4:
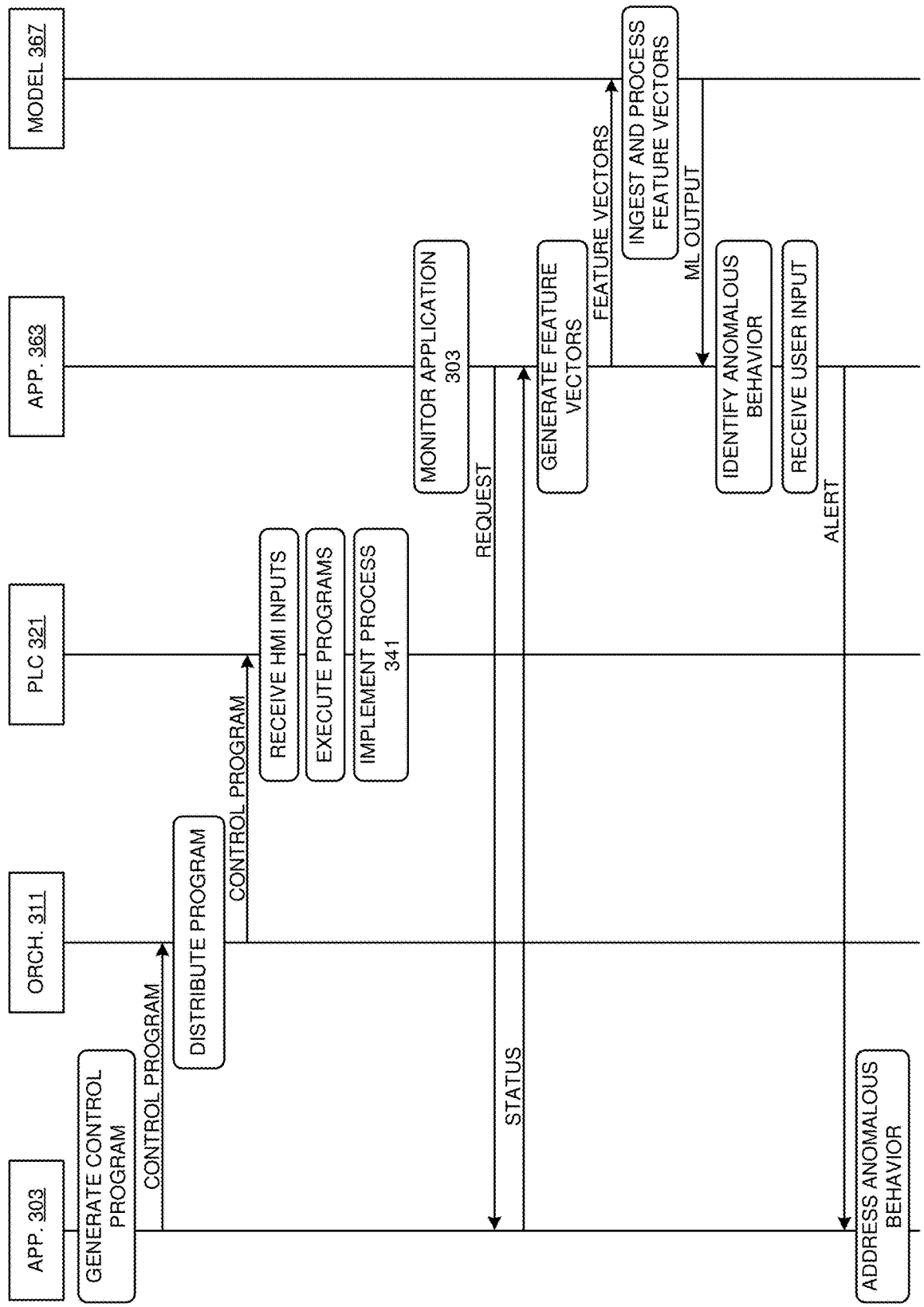
FIG. 4 illustrates an exemplary operation of an industrial automation environment to detect anomalous behavior in an integrated design application.

FIG. 4 illustrates an exemplary operation of industrial automation environment 300 to detect anomalous behavior in an integrated design application. The operation depicted by FIG. 4 comprises an example of process 200 illustrated in FIG. 2, however process 200 may differ. In other examples, the structure and operation of industrial automation environment 300 may be different.

In operation, design application (APP.) 303 generates control program 305. Control program 305 is configured for execution by PLC 321 to drive the operation of OEM devices 351-355. For example, design application 303 may receive a series of drag-and-drop user inputs via user interface 304 that cause design application 303 to construct control program 305. Design application 303 transfers control program 305 to for delivery to PLC 321. Orchestration system 311 coordinates the operation of PLC 321 to execute control program 305. For example, orchestration system 311 may coordinate the operation of PLC 321 based on a user generated operating schedule.

PLC 321 receives control program 305 from design application 303 and the direction from orchestration system 311 to implement control program 305. Additionally, PLC 321 receives user inputs via HMI 331 to augment the execution of control program 305. The user inputs may adjust preset execution parameters used by PLC 321 based on a current plant status. For example, environment 300 may lack sufficient process inputs for industrial automation process 341 and the HMI user inputs may augment the execution of control program 305 to slow the operation of process 341 as to not exhaust the insufficient process inputs.

PLC 321 executes control program 305 and transfers corresponding control signaling to OEM devices 351-355 to implement industrial process 341. For example, OEM device 351 may comprise a heat exchanger and control program 305 may dictate a temperature differential setting for OEM 353. PLC 321 may execute control program 305 and determine a valve setting to achieve a cold-water flow rate that results in the desired temperature differential. PLC 321 may transfer control signaling generated by the execution of control program 305 to OEM device 353. In response, OEM device 353 may activate valve actuators and set the valve to the position indicated by the instructions. OEM devices 351-355 of industrial automation process 341 receive the control signaling from PLC 321. OEM devices 351-355 implement industrial automation process 341 as dictated by the control signaling generated by the execution of control program 305. OEM devices 351-355 generate process data based on their operations and transfer the process data to PLC 321.

Security application 363 monitors the operation of design application 303. Security application 363 transfers a status request to design application 303. For example, security application 363 may drive transceiver circuitry in server 362 to transfer a status request to server 302 for delivery to design application 303. Design application 303 receives the status request and responds by transferring a status report for delivery to security application 363. The status report characterizes the operations and user actions in design application 303. For example, the status report may comprise information characterizing user inputs, program tag types, control program types, and the like.

Security application 363 executes a feature extraction process on the status reports to generate feature vectors. Security application 363 uploads the feature vectors to model repository 366. Machine learning model 367 ingests and processes the feature vectors received by repository 366. Machine learning model 367 generates a machine learning output that indicates the existence of anomalous behavior in design application 303. The anomalous behavior may indicate a mistake made in the generation of control program 305. For example, control program 305 may comprise probabilistically unlikely format that differs from the statistical model used by model 367. Alternatively, the anomalous behavior may indicate malicious activity. For example, model 367 may process the feature vectors using its machine learning algorithms and determine that the rate of inputs received by applications 303 far exceeds a statistically expected input rate and may determine the presence of bot behavior. Model 367 transfers the machine learning output for delivery to security application 363.

Security application 363 receives the machine learning output and identifies the anomalous behavior in design application 303 based on the machine learning output. Security application 363 displays the identified anomalous behavior in IDE security view 365 via user interface 364. Security application 363 receives user inputs via user interface 364 that drive security application 363 to transfer alerts indicating the anomalous behavior to design application 303. Design application 303 receives the alert and responds accordingly. It should be appreciated that the response implemented by design application 303 depends in part on the type of anomaly detected. For example, the alert may indicate that control program 305 comprises abnormal characteristics. In response, design application 303 may correct the detected abnormalities.

Figure 5:
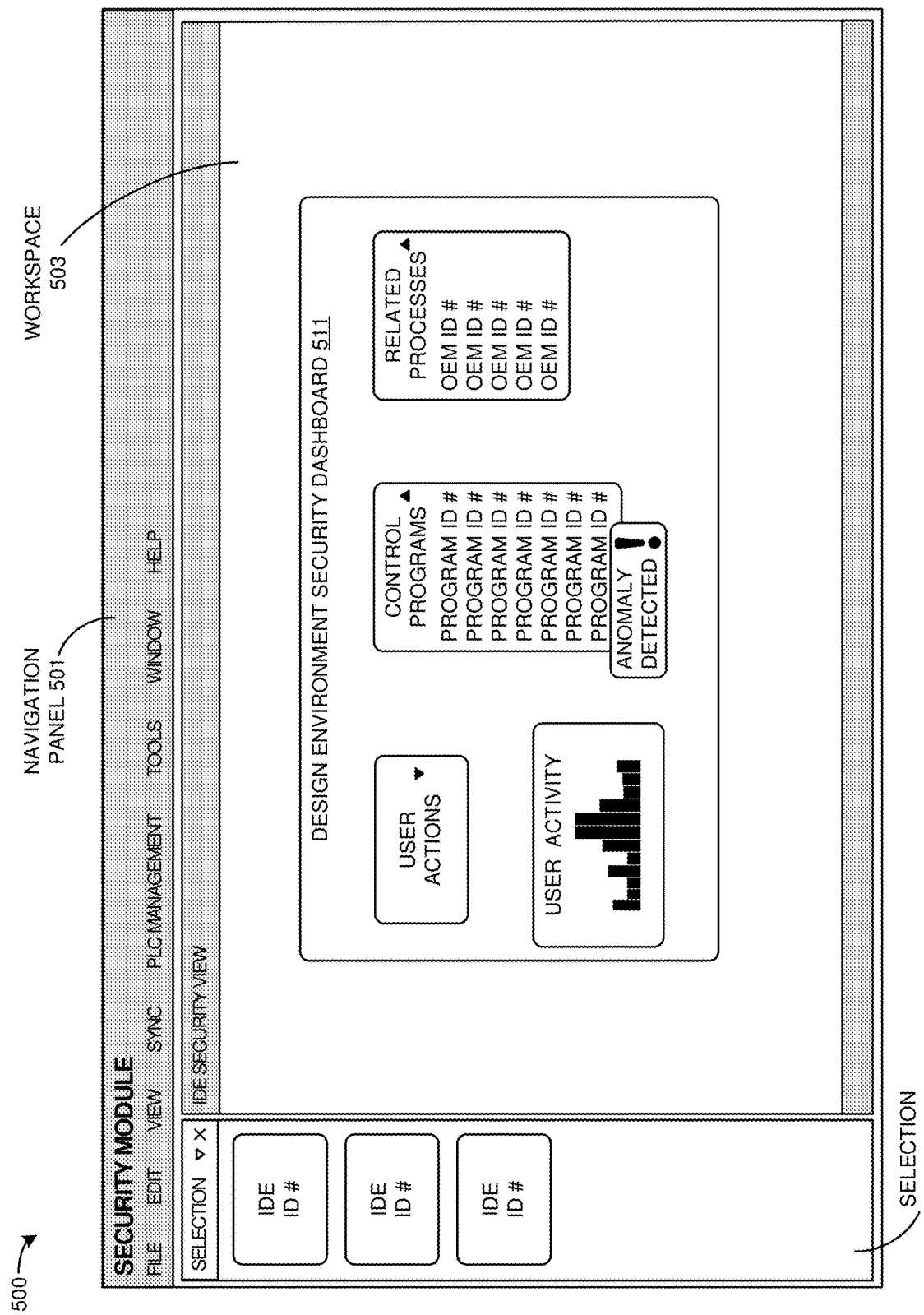
FIG. 5 illustrates an exemplary user interface in the industrial automation environment.

FIG. 5 illustrates user interface 500 to detect anomalous behavior in an integrated design application. User interface 500 comprises an example of user interface 134 and user interface 364, however user interface 134 and user interface 364 may differ. User interface 500 comprises a security application presented on a display screen which is representative of any user interface for detecting malicious and/or anomalous behavior in an integrated design environment. For example, user interface 500 may comprise a GUI configured to allow a user to interact with a security application and corresponding machine learning system.

User interface 500 includes navigation panel 501 that allows a user to access the various features available through user interface 500. Navigation panel 501 comprises tabs like file, edit, view, library management, tools, window, and help. In other examples, navigation panel 501 may comprise fewer tabs, more tabs, and/or different types of tabs. A user may select a tab to access the functionality of the tab. Upon selection, the tabs may open drop down menus that list their functionality. For example, a user may select the file tab and select an option from a drop-down menu to save a project to memory. Navigation panel 501 is located on a top portion of user interface 500 however navigation panel 501 may be located on a different portion of user interface 500. For example, navigation panel 501 may be located on the bottom portion of user interface 500.

User interface 500 incudes selection panel 502. Selection panel 502 comprises a device selection system that allows a user to select IDE icons and view a corresponding security view for the selected IDE. In this example, selection panel 502 comprise three selectable IDE icons. The selectable IDE icons comprise ID numbers (or other types of identifiers) that indicate which IDEs the icons correspond to. In other examples, selection panel 502 may comprise a different number of IDE icons and the IDE icons may include additional or different information. For example, the IDE icons may indicate network and physical locations, active/inactive status, and the like. Selection panel 502 is located on a left portion of user interface 500 however selection panel 502 may be located on a different portion of user interface 500. For example, selection panel 502 may be located on the right portion of user interface 500.

User interface 500 includes workspace 503. Workspace 503 is representative of a computing interface that allows a human operator to view the security status of IDEs within an industrial automation environment. Workspace 503 comprises design environment security dashboard 511. Design environment security dashboard 511 is representative a computing interface with user selectable options that allows a user to view the security status and related information of an IDE in an industrial automation environment. For example, a user may have selected one of the IDE icons in selection panel 502 to assess the security status of the corresponding IDE and user interface 500 may responsively present design environment security dashboard 511 for that IDE in workspace 503. Design environment security dashboard 511 comprises user selectable options labeled user actions, control programs, and related processes. The user selectable options comprise drop-down menus that, in response to selection by a user, open to reveal their contents. In this example, a user has selected the control programs option to view device control programs generated in the IDE and has selected the related processes tab to view OEM devices associated with the control programs. In other examples, a user may select the options for user to view its contents.

Design environment security dashboard 511 comprises visual elements labeled user activity and that provides a graphical representation of user actions within the selected IDE. For example, the visual element for user activity may graphically illustrate the number of user inputs, time/date of inputs, types of inputs, and the like. In other examples, the visual element for user activity may graphically illustrate other types of information related to the selected IDE.

In this example, the visual element for control programs is labeled with an alert notification labeled anomaly detected which indicates that an anomaly has been detected in the control programs generated by the selected IDE. For example, a machine learning model operatively coupled to user interface 500 may have processed feature vectors representing aspects of the control programs and generated a machine learning output that indicates the structure of one of the control programs in abnormal. In response, user interface 500 may mark the visual indicator for control programs with the anomaly detected notification. A user may select the anomaly detected notification to address the detected anomaly. In other examples, user interface 500 may mark a different element of design environment security dashboard 511 with an anomaly detected notification.

Figure 6:
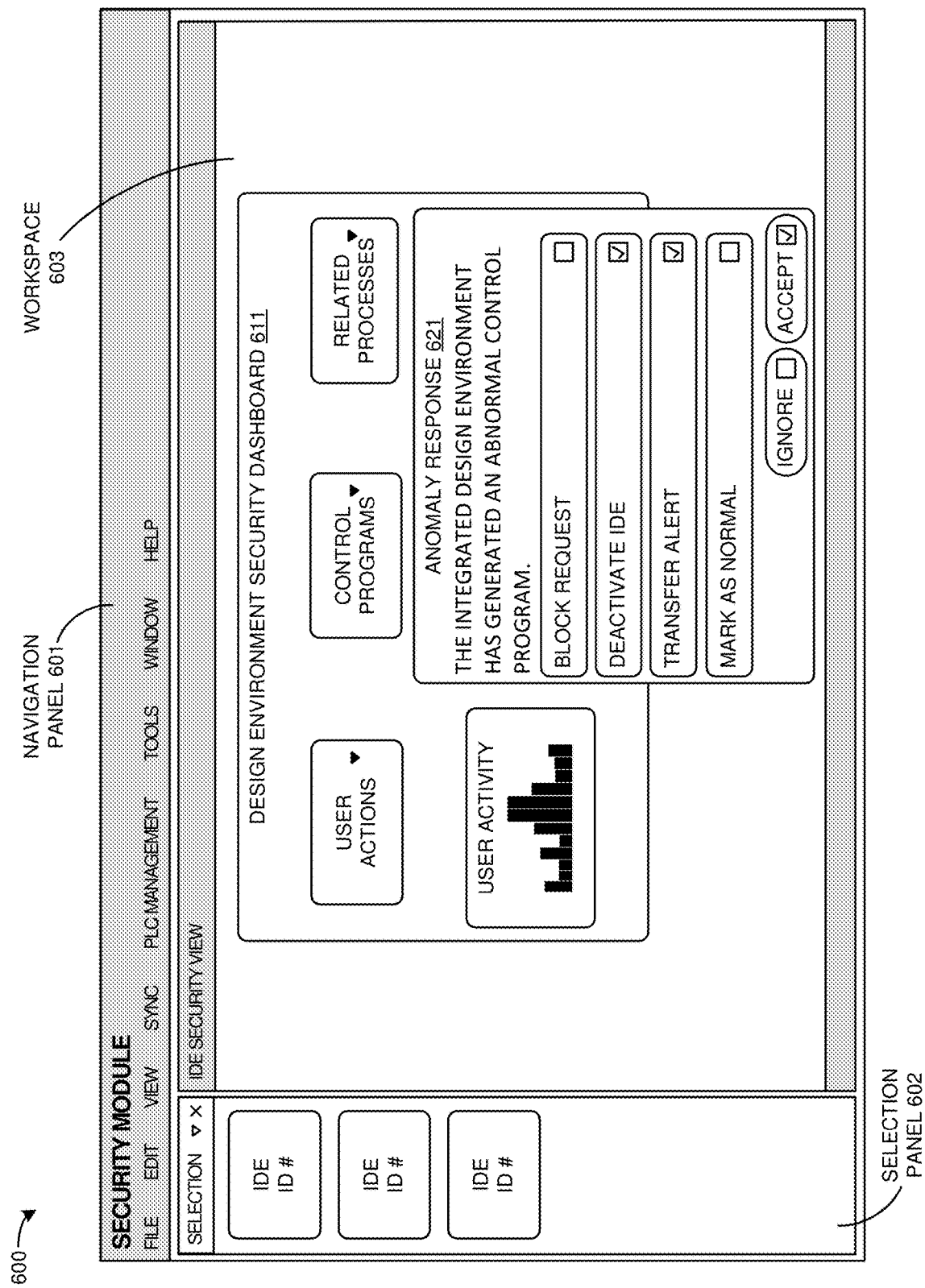
FIG. 6 illustrates an exemplary user interface in the industrial automation environment.

FIG. 6 illustrates user interface 600 to detect anomalous behavior in an integrated design application. User interface 600 comprises an example of user interface 134 and user interface 364, however user interface 134 and user interface 364 may differ. User interface 600 comprises a security application presented on a display screen which is representative of any user interface for detecting malicious and/or anomalous behavior in an integrated design application. For example, user interface 600 may be generated in response to the selection of the alert notification labeled anomaly detected as illustrated in FIG. 5.

User interface 600 includes navigation panel 601 that allows a user to access the various features available through user interface 600. Navigation panel 601 comprises tabs like file, edit, view, library management, tools, window, and help. In other examples, navigation panel 601 may comprise fewer tabs, more tabs, and/or different types of tabs. A user may select a tab to access the functionality of the tab. Upon selection, the tabs may open drop down menus that list their functionality. Navigation panel 601 is located on a top portion of user interface 600 however navigation panel 601 may be located on a different portion of user interface 600.

User interface 600 incudes selection panel 602. Selection panel 602 comprises a device selection system that allows a user to select IDEs and view a corresponding security view for the selected IDE. In this example, selection panel 602 comprise three selectable IDE icons. The selectable IDE icons comprise ID numbers that correspond to IDEs in an automated industrial environment. Selection panel 602 is located on a left portion of user interface 600 however selection panel 602 may be located on a different portion of user interface 600.

User interface 600 includes workspace 603. Workspace 603 is representative of a computing interface that allows a human operator to view the security status of IDEs within an industrial automation environment. Workspace 603 comprises design environment security dashboard 611. Design environment security dashboard 611 is representative a computing interface with user selectable options that allows a user to view the security status and related information of an IDE in an industrial automation environment. Design environment security dashboard 611 comprises various textual and visual elements that depict the security state of an IDE. Overlaid on design environment security dashboard 611 is anomaly response window 621. Anomaly response 621 comprises a set of user selectable options that allow a user to respond to the detection of an anomaly in the IDE that corresponds to design environment security dashboard 611. For example, a user may have selected an anomaly detected notification (e.g., the anomaly detected notification illustrated in FIG. 5) and user interface 600 may display anomaly response 621 in response to the selection.

In this example, anomaly response window 621 indicates the integrated design environment has generated an abnormal control program. Anomaly response 621 includes a set of user selectable options to block requests, deactivate the IDE, transfer an alert, and to mark the requests as normal. In other examples, anomaly response 621 may comprise different user selectable options to respond to the detected anomaly. In this example, a user has elected to deactivate the IDE and transfer an alert indicating the anomaly. Once a user has finalized their selections, they may select the option labeled accept to implement their selections. Alternatively, the user may select the option labeled ignore to close anomaly response window 621 without responding to the detected anomaly. In this example, the user has selected the accept button to implement their response. In response to the user selection of the accept button, the security application presented via user interface 600 implements the user selected response to detected anomaly.

Figure 7:
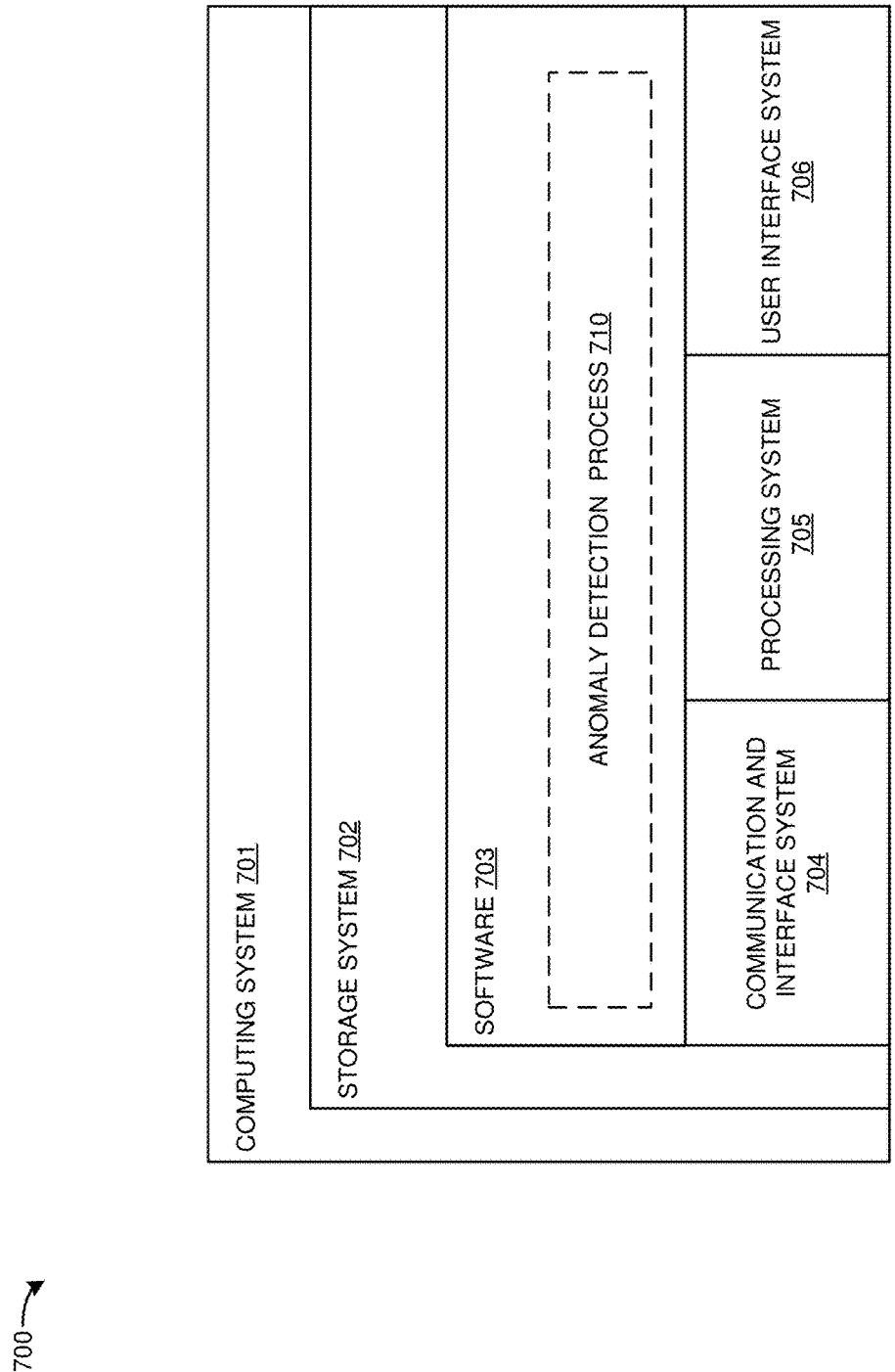
FIG. 7 illustrates an exemplary computing device that may be used in accordance with some embodiments of the present technology.

FIG. 7 illustrates computing system 701 according to an implementation of the present technology. Computing system 701 is representative of any system or collection of systems with which the various operational architectures, processes, scenarios, and sequences disclosed herein for detecting anomalous behavior in integrated design applications may be employed. For example, computing system 701 may be representative of computing device 102, user interface 103, repository 132, user interface 134, server 302, orchestration system 211, PLC 321, HMI 331, server 362, repository 366, and/or any other computing device contemplated herein. Computing system 701 may be implemented as a single apparatus, system, or device or may be implemented in a distributed manner as multiple apparatuses, systems, or devices. Computing system 701 includes, but is not limited to, storage system 702, software 703, communication interface system 704, processing system 705, and user interface system 706. Processing system 705 is operatively coupled with storage system 702, communication interface system 704, and user interface system 706.

Processing system 705 loads and executes software 703 from storage system 702. Software 703 includes and implements anomaly detection process 710, which is representative of any of the integrated design application anomaly detection processes discussed with respect to the preceding Figures, including but not limited to the industrial control, anomalous and malicious activity prevention, and user interface operations described with respect to the preceding Figures. For example, anomaly detection process 710 may be representative of process 200 illustrated in FIG. 2 and/or the exemplary operation of environment 300 illustrated in FIG. 4. When executed by processing system 705 to detect and prevent anomalous behavior in an integrated design application, software 703 directs processing system 705 to operate as described herein for at least the various processes, operational scenarios, and sequences discussed in the foregoing implementations. Computing system 701 may optionally include additional devices, features, or functionality not discussed for purposes of brevity.

Processing system 705 may comprise a micro-processor and other circuitry that retrieves and executes software 703 from storage system 702. Processing system 705 may be implemented within a single processing device but may also be distributed across multiple processing devices or subsystems that cooperate in executing program instructions. Examples of processing system 705 include general purpose CPUs, GPUs, DSPs, ASICs, FPGAs, and logic devices, as well as any other type of processing device, combinations, or variations thereof.

Storage system 702 may comprise any computer readable storage media readable by processing system 705 and capable of storing software 703. Storage system 702 may include volatile, nonvolatile, removable, and/or non-removable media implemented in any method or technology for storage of information, such as computer readable instructions, data structures, program modules, or other data. Examples of storage media include RAM, read only memory, magnetic disks, optical disks, optical media, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 702 may also include computer readable communication media over which at least some of software 703 may be communicated internally or externally. Storage system 702 may be implemented as a single storage device but may also be implemented across multiple storage devices or sub-systems co-located or distributed relative to each other. Storage system 702 may comprise additional elements, such as a controller, capable of communicating with processing system 705 or possibly other systems.

Software 703 (including anomaly detection process 710) may be implemented in program instructions and among other functions may, when executed by processing system 705, direct processing system 705 to operate as described with respect to the various operational scenarios, sequences, and processes illustrated herein. For example, software 703 may include program instructions for generating feature vector that represent the user actions within an integrated design application and identify anomalous behavior in the integrated design application based on a machine learning output as described herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 703 may include additional processes, programs, or components, such as operating system software, virtualization software, or other application software. Software 703 may also comprise firmware or some other form of machine-readable processing instructions executable by processing system 705.

In general, software 703 may, when loaded into processing system 705 and executed, transform a suitable apparatus, system, or device (of which computing system 701 is representative) overall from a general-purpose computing system into a special-purpose computing system customized to detect anomalous and malicious activity in an integrated design application and present identified anomalous and malicious activity on a user interface as described herein. Indeed, encoding software 703 on storage system 702 may transform the physical structure of storage system 702. The specific transformation of the physical structure may depend on various factors in different implementations of this description. Examples of such factors may include, but are not limited to, the technology used to implement the storage media of storage system 702 and whether the computer-storage media are characterized as primary or secondary storage, as well as other factors.

For example, if the computer readable storage media are implemented as semiconductor-based memory, software 703 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 704 may include communication connections and devices that allow for communication with other computing systems (not shown) over communication networks (not shown). Examples of connections and devices that together allow for inter-system communication may include network interface cards, antennas, power amplifiers, radiofrequency circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

Communication between computing system 701 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of networks, or variation thereof. The aforementioned communication networks and protocols are well known and an extended discussion of them is omitted for the sake of brevity.

While some examples provided herein are described in the context of computing devices for anomaly detection in an integrated design application, it should be understood that the condition systems and methods described herein are not limited to such embodiments and may apply to a variety of other industrial automation environments and their associated systems. As will be appreciated by one skilled in the art, aspects of the present invention may be embodied as a system, method, computer program product, and other configurable systems. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number, respectively. The word "or" in reference to a list of two or more items, covers all of the following interpretations of the word: any of the items in the list, all of the items in the list, and any combination of the items in the list.

The phrases "in some embodiments," "according to some embodiments," "in the embodiments shown," "in other embodiments," and the like generally mean the particular feature, structure, or characteristic following the phrase is included in at least one implementation of the present technology and may be included in more than one implementation. In addition, such phrases do not necessarily refer to the same embodiments or different embodiments.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for" but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

What is claimed is:

1. A system to detect malicious behavior in an industrial automation environment, the system comprising:
 a memory that stores executable components; and
 a processor, operatively coupled to the memory, that executes the executable components, the executable components comprising:
 a security component configured to monitor an integrated design application, generate feature vectors that represent generation of a control program in the integrated design application wherein the control program is executable by a Programmable Logic Controller (PLC) to drive an industrial automated process, and supply the feature vectors to a machine learning engine, wherein the security component comprises at least one of the executable components;
 the security component configured to process a machine learning output that indicates when anomalous behavior is detected during the generation of the control program in the integrated design application; and
 in response to detecting the anomalous behavior during the generation of the control program in the integrated design application, the security component configured to generate and transfer an alert that characterizes the anomalous behavior.

2. The system of claim 1 further comprising:
 a machine learning component configured to ingest the feature vectors, process the feature vectors using its constituent machine learning algorithms to detect the anomalous behavior during the generation of the control program in the integrated design application, and generate the machine learning output.

3. The system of claim 1 further comprising:
 the security component configured to generate training feature vectors that represent a set of expected actions in the integrated design application and supply the training feature vectors to the machine learning engine; and
 the security component configured to receive a training output that comprises a statistical model of the integrated design application.

4. The system of claim 1 wherein the anomalous behavior comprises an input source Internet Protocol (IP) address.

5. The system of claim 1 wherein the anomalous behavior comprises bot behavior.

6. The system of claim 1 wherein the anomalous behavior comprises a control program type.

7. The system of claim 1 wherein the machine learning engine comprises neural network auto-encoders and unsupervised anomaly detection algorithms.

8. A method to detect malicious behavior in an industrial automation environment, the method comprising:
 monitoring, by a system comprising a processor, an integrated design application, generating feature vectors that represent generation of a control program in the integrated design application wherein the control program is executable by a Programmable Logic Controller (PLC) to drive an industrial automated process, and supplying the feature vectors to a machine learning engine;
 processing, by the system, a machine learning output that indicates when anomalous behavior is detected during the generation of the control program in the integrated design application; and
 in response to detecting the anomalous behavior during the generation of the control program in the integrated design environment, generating and transferring, by the system, an alert that characterizes the anomalous behavior.

9. The method of claim 8 further comprising:
 ingesting, by the system, the feature vectors, processing the feature vectors using machine learning algorithms to detect the anomalous behavior during the generation of the control program in the integrated design application, and generating the machine learning output.

10. The method of claim 8 further comprising:
generating, by the system, training feature vectors that represent a set of expected actions in the integrated design application and supplying the training feature vectors to the machine learning engine; and
receiving, by the system, a training output that comprises a statistical model of the integrated design application.

11. The method of claim 8 wherein the anomalous behavior comprises an input source Internet Protocol (IP) address.

12. The method of claim 8 wherein the anomalous behavior comprises bot behavior.

13. The method of claim 8 wherein the anomalous behavior comprises a control program type.

14. The method of claim 8 wherein the machine learning engine comprises neural network auto-encoders and unsupervised anomaly detection algorithms.

15. A non-transitory computer-readable medium stored thereon instructions to detect malicious behavior in an industrial automation environment that, in response to execution, cause a system comprising a processor to perform operations, the operations comprising:
monitoring an integrated design application;
generating feature vectors that represent generation of a control program in the integrated design application wherein the control program is executable by a Programmable Logic Controller (PLC) to drive an industrial automated process;
supplying the feature vectors to a machine learning engine;
processing a machine learning output that indicates when anomalous behavior is detected during the generation of the control program in the integrated design application;
in response to detecting the anomalous behavior during the generation of the control program in the integrated design application, generating an alert that characterizes the anomalous behavior; and
transferring the alert.

16. The non-transitory computer-readable medium of claim 15, the operations further comprising:
ingesting the feature vectors,
processing the feature vectors using machine learning algorithms to detect the anomalous behavior during the generation of the control program in the integrated design application; and
generating the machine learning output.

17. The non-transitory computer-readable medium of claim 15, the operations further comprising:
generating, training feature vectors that represent a set of expected actions in the integrated design application;
supplying the training feature vectors to the machine learning engine; and
receiving a training output that comprises a statistical model of the integrated design application.

18. The non-transitory computer-readable medium of claim 15 wherein the anomalous behavior comprises an input source Internet Protocol (IP) address.

19. The non-transitory computer-readable medium of claim 15 wherein the anomalous behavior comprises bot behavior.

20. The non-transitory computer-readable medium of claim 15 wherein the anomalous behavior comprises a control program type.

\* \* \* \* \*